United States Patent [19]

Groetzner et al.

[11] 3,830,570

[45] Aug. 20, 1974

[54] VEHICLE HEADLIGHT TESTING METHOD AND APPARATUS

[75] Inventors: Kurt Groetzner, Stuttgart; Rudolf Mayer, Bunzwangen; Siegfried Mayer, Esslingen, all of Germany

[73] Assignee: Robert Bosch GmbH, Stuttgart, Germany

[22] Filed: June 13, 1973

[21] Appl. No.: 369,737

[30] Foreign Application Priority Data
June 26, 1972 Germany............................ 2231227

[52] U.S. Cl................. 356/121, 356/154, 356/172, 250/208, 33/288
[51] Int. Cl. ............................................. G01j 1/00
[58] Field of Search ........... 356/121, 153, 154, 172; 33/288; 250/208

[56] References Cited
UNITED STATES PATENTS
3,532,432   10/1970   Mansour............................ 356/121
3,603,691   9/1971   Hamilton............................ 356/112
3,746,449   7/1973   Schick................................ 356/121

Primary Examiner—Ronald L. Wibert
Assistant Examiner—Paul K. Godwin
Attorney, Agent, or Firm—William R. Woodward; Flynn & Frishauf

[57] ABSTRACT

A test stand is rolled on rails across the front of a vehicle with lighted headlights, and the height at which illumination is detected is registered on indicator lamps. A vertically movable test assembly then automatically moves down to the first level at which illumination was detected, extinguishing the corresponding register lamps, after which the test stand makes another pass, stopping at each headlight, first to locate the test assembly accurately opposite the headlight and then to determine whether the upper boundary of the headlight beam is correct or, if not, by what amount it deviates from the norm. An additional pass is made before the entire apparatus is reset if any register lamps, not extinguished for a previous pass but lighted on the first pass, are still lit.

26 Claims, 8 Drawing Figures

VEHICLE HEADLIGHT TESTING METHOD AND APPARATUS

This invention relates to methods and apparatus for testing the headlights of a motor vehicle.

Motor vehicle headlights have heretofore been tested by bringing a headlight adjustment apparatus mounted on a movable stand in front of the motor vehicle headlights to be tested and then putting the test equipment manually in a position directly opposite the headlight, after which the light-to-dark boundary of the headlight beam is projected on a screen and compared with a standard light-to-dark boundary drawn on the screen. On the basis of this comparison the specialized operators of the test equipment could make a determination of the quality of the headlight adjustment. A more or less large deviation of the light-to-dark boundary indicates a poor headlight adjustment, whereas substantial registration of the light-to-dark boundary of the headlight with the line drawn on the measuring screen indicates a correct headlight adjustment.

A disadvantage of this type of testing of motor vehicle headlights lies in the fact that the testing equipment must be set by hand directly opposite the headlight to be tested. A further disadvantage results from the fact that the test result must be determined by visually interpreting the pattern on a measuring screen. In consequence observation inaccuracies and observation errors are possible, so that under certain circumstances no reliable judgment can be made regarding the headlight adjustment. Furthermore, specially trained personnel are necessary for the adjustment of the test equipment and the reading of the test results, so that, in addition, the procedure is very costly. Finally, the setting up of the test equipment and its adjustment in the desired position is objectionably time consuming.

It is accordingly an object of this invention to provide a method and equipment for quickly and economically testing motor vehicle headlights and to enable the testing procedure to be carried out by assistants without any special training and, finally, to provide consistently accurate test results in a short time. More particularly, it is an object of the invention to provide the test results in the form of electrical values, so that it can be a meaningful objective evaluation as an element of an overall motor vehicle examination or inspection.

It is a further object of the invention to provide efficient and economical equipment for the test method which will be simple in construction and particularly adapted for providing reliable test results, even though subject to rough handling in a repair shop or service station.

Subject matter of the present invention

Briefly, a headlight testing device is provided with an automatic drive in a plane parallel to the front of the motor vehicle and is arranged so that when the test device is moved to the neighborhood of a headlight, a control system is activated that automatically moves the test equipment to bring it directly opposite the headlight to be tested, at which point the positioning drive of the test equipment is shut off and the testing of the headlight is carried out.

The equipment for use according to the present invention in the method just described utilizes a test device incorporating the previously used optical system for checking the light-to-dark boundary of the headlight to be tested, mounted in such a manner to be displaced both horizontally and vertically by a suitable drive. at least two light sensitive sensors are provided on the front of the test device for interrupting the current supply circuit of the drive when a predetermined level and balance of illumination is reached.

The invention will be described by way of example with reference to the accompanying drawings, wherein.

Figure 1:
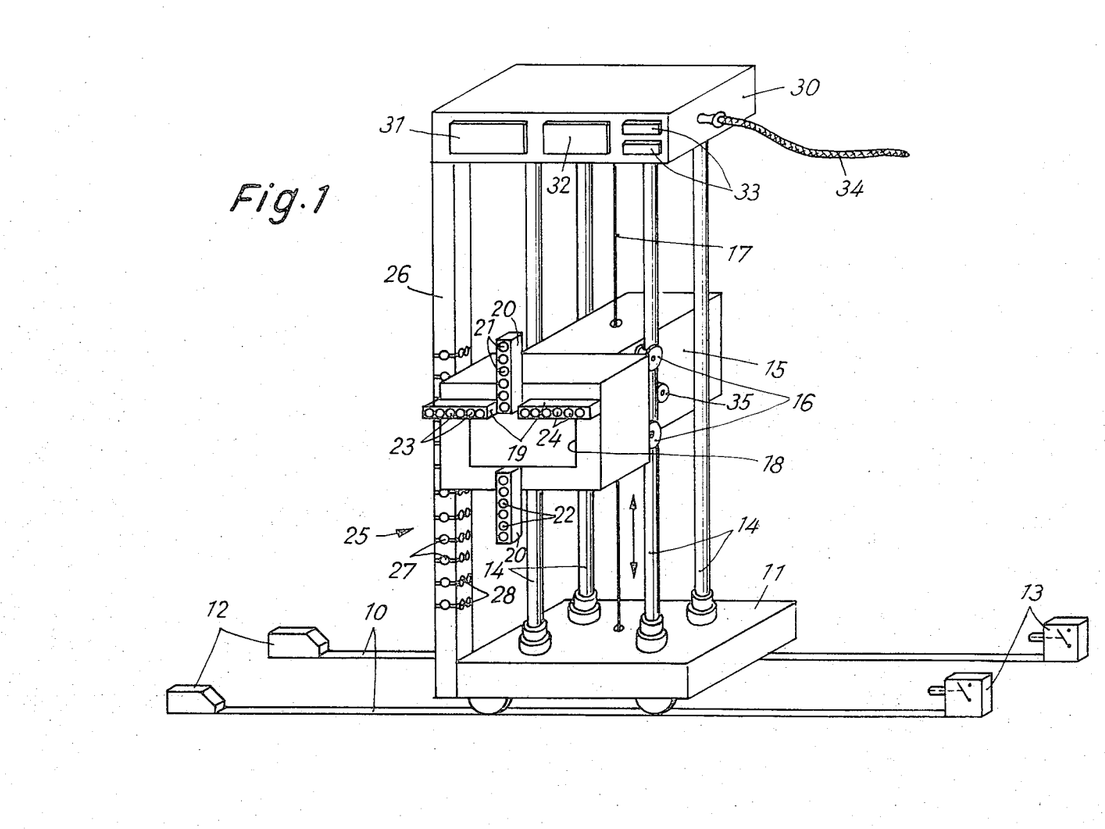
FIG. 1 is a diagrammatic perspective view of apparatus for testing motor vehicle headlights.

FIG. 1 is a schematic representation of an apparatus for testing motor vehicle headlights in accordance with the present invention. A rolling base 11, movable along the rails 10 carries the test stand. The rails 10 lie parallel to the front of the motor vehicle which is brought into position for testing its headlights. The displacement path of the rolling test stand 11 is limited by stops 12 and/or limit switches 13 serving to switch off the activation of the horizontal drive (not shown) for the test stand. On the rolling base 11 are mounted support columns 14, which may be steel tubes, on which a test assembly 15 is supported and vertically movable. The test assembly 15 is held to the support columns 14 by rollers 16 and 35 and may be displaced vertically by means of a cable tackle 17.

The test assembly 15, of which the details of construction will be described at a later point, has an opening 18 at its front end in the neighborhood of which two intersecting cross pieces 19 and 20 are provided. Each of the cross pieces 19 and 20 is subdivided into two parts, each of which is equipped with light sensitive sensors, in the form of light sensitive resistors 21, 22, 23 and 24.

On the test stand, offset to one side of the test assembly, is a strut 26 which carries a vertical array of sensors 27 that form part of a storage register unit 25. The strut 26 also carries a corresponding array of indicator lamps 28, likewise mounted one above the other on the strut 26, to each of which a light sensitive resistor 27 is related. Opposite the indicator lamps 28, but not visible in FIG. 1, are three light sensitive sensors mounted one above the other on the test assembly 15, each with a light sensitive resistor 29, arranged so that they may be opposite to three of the lamps 28 as the test assembly 15 is moved up and down. At their upper extremities the support columns 14 are held by an upper end piece 30, in the front of which indicating devices 31, 32 and 33, for the results of the headlight test, are located. A supply cable 34 connected to the upper end piece 30 supplies the entire apparatus with operating voltage from an electric power source (not shown).

Figure 2:
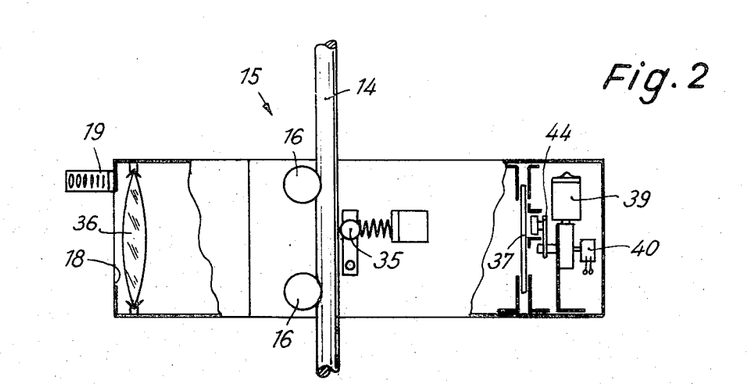
FIG. 2 is a diagrammatic side view, partly in section, of the test assembly of the apparatus.

FIG. 2 is a side view, partly in section, of the test assembly 15. Two rollers 16 and a pressure roller 35 are shown by which the test assembly 15 is guided along one of the support columns 14. Behind the opening 18 of the test assembly 15 a lens 16 is mounted through which the light from a headlight (not shown) is concentrated on a measuring screen 37, on which the position of a standard light-to-dark boundary 38 is drawn as may be more particularly recognized from FIG. 4. The measuring screen 37 is mounted so as to be displaceable vertically by means of a crank drive 44 powered by an electric motor 39. A measuring potentiometer 40 is connected to the crank drive and its resistance value varies in accordance with the position of the measuring screen, so that by connecting the potentiometer 40 to a supply voltage, an electric signal characteristic of the position of the measuring screen can be obtained from the tap of the potentiometer for every position of the measuring screen.

Figure 3:
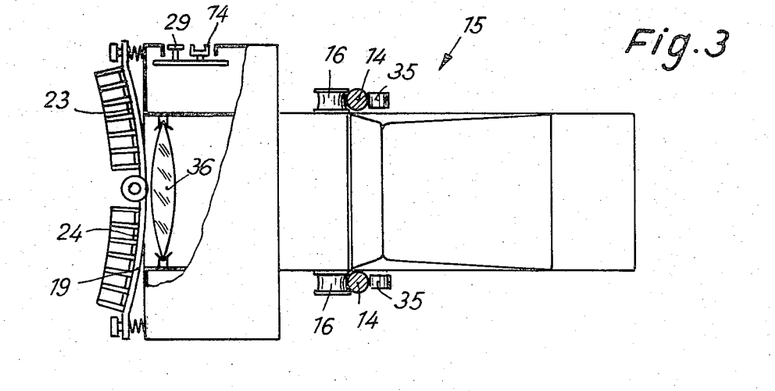
FIG. 3 is a plan view, partly in section, of the same test assembly.

FIG. 3 is a top view of the test assembly 15, likewise partly in section. In front of the lens 36 is set the cross piece 19 carrying the light sensitive resistors 23 and 24 (as shown in FIG. 2, the cross piece 19 is located above the opening 18). The test assembly 15, as already mentioned in connection with FIG. 2, is guided on support columns 14 by rollers 16 and pressure rollers 35. Three light sensitive resistors 29, of which only one is visible in FIG. 3, are provided on one side of the test assembly 15. Next to each of the light sensitive resistors 29 is a magnet 74 which is designed to serve for activating sealed magnetic reed contacts of the storage register unit. Details of construction of this storage register unit will be provided at a latter point.

Figures 4, 5:
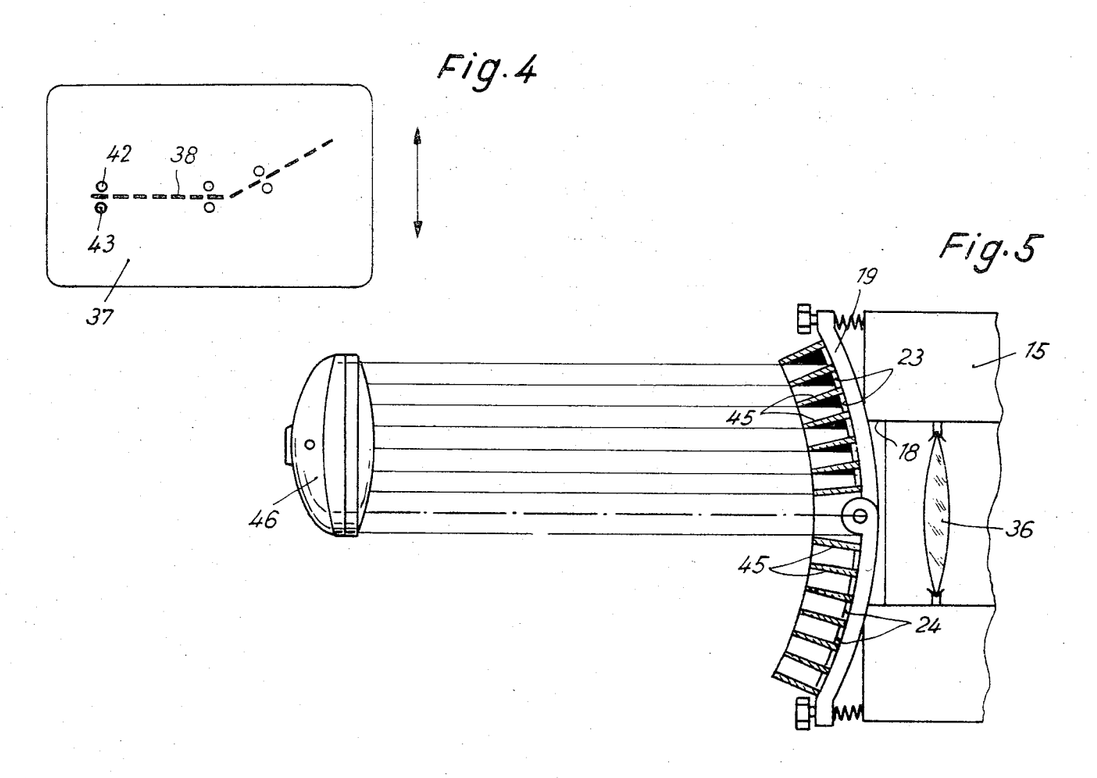
FIG. 4 is a plan view of the measuring screen of the test assembly.
FIG. 5 is a diagram of the front of the test assembly of the apparatus as illuminated by a headlight which is off center with respect to the test assembly.

FIG. 4 shows, as already mentioned, a measuring screen 37 on which is drawn the desired light-to-dark boundary 38 for the headlight 46. Tolerance ranges are provided on each side of this light-to-dark boundary, these tolerance bands being formed by rows of light sensitive diodes 42 and 43 respectively. The diodes 42 thus provide the upper tolerance limit and the diodes 43 the lower tolerance limit.

The manner of operation of the apparatus described up to this point is as follows. A motor vehicle not shown in the drawings is driven with lighted headlights up to the neighborhood of the rails 10 of the test stand 11, so that the rails 10 run substantially parallel to the front of the vehicle, whose headlights are now to be tested. The initial position of the rolling test stand is at the left end of the rails 10 and in this initial position, the test assembly 15 is held near the top of the support columns by its lift cable 17.

A start button, not shown in the drawings, is then actuated, which causes the test stand to roll to the right. The drive for the test stand is a two-wheel drive in order to prevent tilting in the direction of travel. The drive motor drives two running wheels of the rolling stand by means of two separate chain drives made of synthetic material. The rolling stand is also supported on two other wheels, which for increasing the stability of the device, run undriven on the rails 10.

It can happen that when the test stand is moved to the right, no headlight will be found set at the height of the test assembly. The rolling stand 11 will then reach its righthand end position and there generate a signal which will produce a vertical displacement of the test assembly 15. After such displacement of the test assembly 15 by a particular amount, the test stand will be moved back to the left. If in this case a headlight comes into the neighborhood of the opening 18, which headlight is then detected by the light sensitive resistors 21, 22, 23 and 24 of the cross pieces 19 and 20, a control apparatus is then switched in which controls the test stand 11 and the test assembly 15 in such a way that the test assembly, that is, the opening 18 of the test assembly 15, is brought exactly opposite the headlight to be tested. This operation occurs as follows: if as shown in FIG. 5 the headlight is not located directly opposite the opening 18, but is offset from the opening 18 only so far that it is still in the neighborhood of the cross pieces 19 and 20, some but not all of the photo resistances 23 or 24 mounted on the cross piece 19 will be illuminated. As appears from FIG. 5, the cross piece 19 is bent and borings 45 are provided in it in which the light sensitive resistances 23 and 24 are mounted. The borings in the cross piece 19 are so oriented that the extension of their axes intersect at the center of curvature of the cross piece 19.

Figure 6:
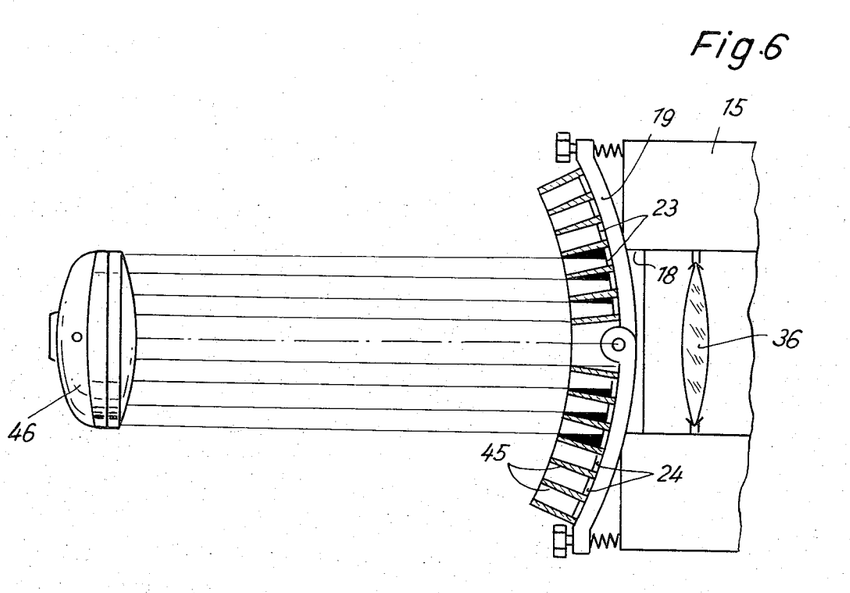
FIG. 6 is a diagram like FIG. 5 in which the illuminating headlight is centered exactly opposite the test assembly.

If now as shown in FIG. 5 a headlight 46 (of a motor vehicle not shown) is located off center with respect to the opening 18 of the test assembly 15, only a portion of the light sensitive resistors will be illuminated, in the case shown only the light sensitive resistors 23. All the light sensitive resistors 23 are connected in series and the group is connected to a first input of a differential amplifier. The light sensitive resistors 24 are likewise connected in series with the group connected to the other input of the differential amplifier. For equal resistance values of the two sets of series connected light sensitive resistors 23 and 24 respectively, electric signals of equal magnitude appear at the inputs of the differential amplifier, so that the drive motor for displacement of the rolling stand 11 on the rails 10 is not activated. That case is shown in FIG. 6. On the other hand, in the situation shown in FIG. 5, where only part of the light sensitive resistors 23 and 24 are illuminated or only one of the two groups of photoresistors, a motor (not shown in the drawing) is activated for moving the test stand 11 on the rails 10 until the headlight is exactly opposite the opening 18. When this desired position is reached, the drive of the test stand 11 is shut off. Thereafter the light-to-dark boundary of the beam of the headlight 46 can be compared with the light-to-dark boundary 38 on the measuring screen 37.

Figure 7:
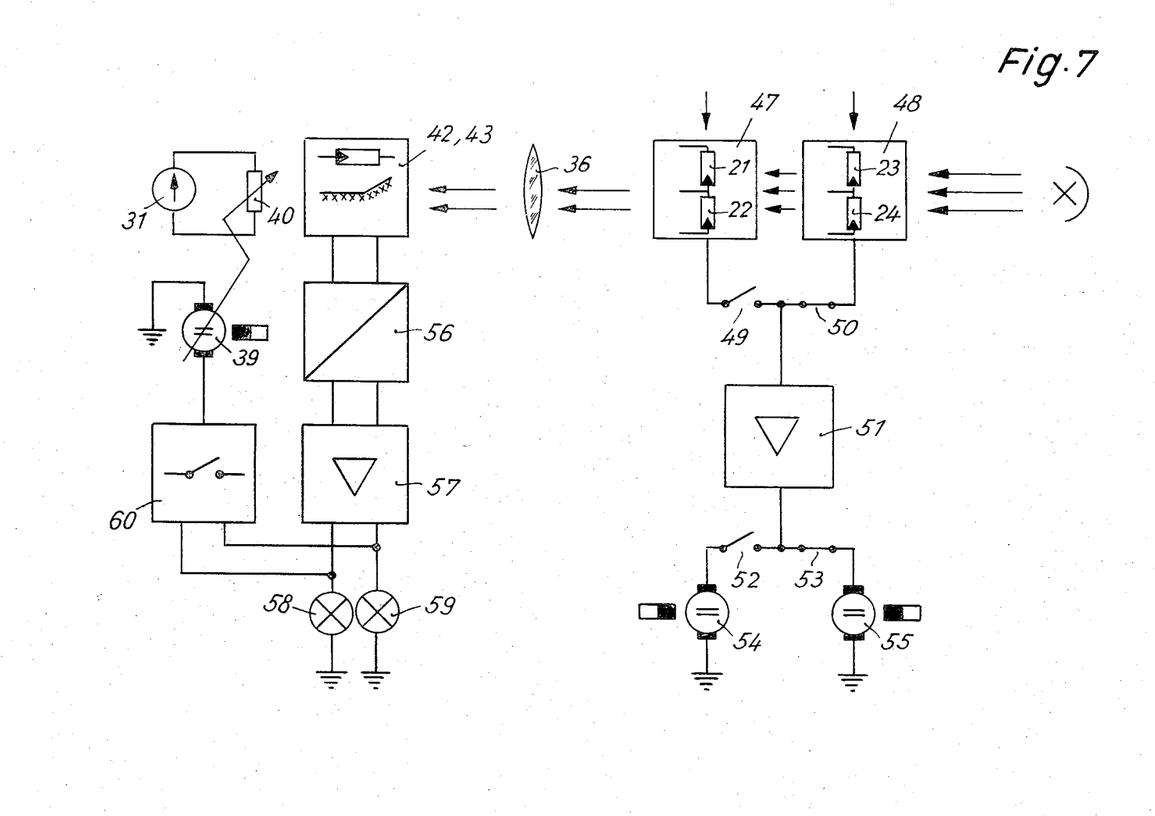
FIG. 7 is a block diagram of the circuit of the apparatus.

FIG. 7 is a basic diagram in block diagram form with reference to which the procedure briefly outlined above can be explained in more detail. The blocks 47 and 48 represent apparatus respectively associated with the cross pieces 19 and 20 and their respective groups of light sensitive resistors 21, 22, 23 and 24. The two units 47 and 48 are respectively connected over switches 49 and 50, in alternation, to a differential amplifier 51. With the switch 49 closed and the switch 50 open, the series chain of the light sensitive resistors 21 is connected to a first input of the differential amplifier and the series chain of the light sensitive resistors 22 is connected to a second input of the differential amplifier. With the switch 49 closed and the switch 50 open, a switch 52 is likewise closed which is connected with the output of the differential amplifier 51, and a switch 53 is opened which is likewise connected with the differential amplifier 51 output. If the light sensitive resistor groups 21 and 22 are equally illuminated, the output of the differential amplifier 51 is at zero and the motor 54 connected to the output of the differential amplifier 51 over the switch 52 is not actuated. If however one of the groups of the light sensitive resistors 21 or 22 is more strongly illuminated than the other, a signal appears at the output of the differential amplifier 51 that causes the motor 54 to turn and to displace the test assembly 15 by means of the lift cable 17, until the opening 18 of the test assembly is directly opposite the headlight 46. As the result of this vertical displacement, the two groups of light sensitive resistors 21 and 22 will be equally strongly illuminated at a position in which the headlight 46 is directly opposite the opening 18, and when this happens the motor 54 will stop. Thereafter a switching over of the switches 49, 59, 52 and 53 is produced, so that the switches 50 and 53 are now closed while the switches 49 and 52 are open. A balance then takes place in the horizontal direction, that is, a motor 55 then displaces the rolling stand 11 along the rails 10 just enough to bring the opening 18 exactly opposite the headlight 46, also in the horizontal direction. In this operation the two groups of light sensitive resistors 23 and 24 are brought to equal illumination, and the output of the differential amplifier 51 is again brought to zero, at which point the motor 55 is shut off. The sequence of these balancing operations, whether vertical first or horizontal first, is unimportant and may be chosen either way. Indeed, the apparatus can also be arranged to provide simultaneous balancing adjustment in the horizontal and vertical directions if two differential amplifiers are used.

After the test assembly 15 has been brought directly opposite the headlight 46, the light-to-dark boundary of the headlight is projected on the measuring screen 37 and can be compared with the light-to-dark boundary 38 established on the measuring screen 37. It may then be conveniently determined by means of the light sensitive diodes 42 or 43 whether the light-to-dark boundary of the headlight lies above or below the light-to-dark boundary 38 drawn on the screen 37. If the light-to-dark boundary of the headlight does lie above or below the prescribed position, the height of the measuring screen 37 can be changed by means of the electric motor 39 of FIG. 2 and the crank drive 44 connected thereto, until the light-to-dark boundary is located between the light sensitive diodes 42 and 43 and thus coincides with the light-to-dark boundary 38 on the measuring screen 37. The vertical displacement of the measuring screen 37 can be indicated by means of the potentiometer 40, the setting of which is displaced correspondingly to the rotation of the electric motor 39 or of the crank drive 44, so that the voltage appearing at the tap of the potentiometer 40 indicates the position of the measuring screen 37 at the particular time. From this electrical signal, a reading can be obtained that is a measure for the readjustment of the headlight 46.

FIG. 7 shows schematically how the apparatus for the operation just described is constituted. The photo diodes 42 and 43 are connected to a logic circuit 56 which determines and indicates whether the light-to-dark boundary of the headlight lies inside or outside the prescribed tolerance region between the diodes 42 and the diodes 43. The output signal of the logic circuit 56 is provided to an amplifier 57, to a good/bad indication device, which operates by lightning an indicator lamp 58 in the case of a correct headlight adjustment and lighting a lamp 59 in the case of an incorrect headlight adjustment. At the same time the output signal of the amplifier 57 is provided over a switch 60 to the electric motor 39 which shifts the measuring screen until the "good" indication results, that is, until the light-to-dark boundary of the headlight coincides with1the light-to-dark boundary 39 on the measuring screen 37 in its shifted position. The rotation of the electric motor 39 is carried over to the potentiometer 40 which indicates the vertical displacement of the measuring screen by means of a meter 31, from which a reading for the adjustment of the headlight may be obtained.

After a successful testing of the headlight and, if necessary, an appropriate readjustment of the headlight, a start button is again actuated, so that the test assembly 15 will be moved further by displacement of the test stand 11 on the rails 10 until it comes into the neighborhood of the next headlight to be tested on the vehicle. The operation of the automatic positioning of the test assembly in a position directly opposite the headlight is then repeated in the manner already described.

The procedure described and the related equipment likewise described are well suited to simplify the testing of motor vehicle headlights. The intermittent back-and-forth and up-and-down movement of the test assembly, in a meandering type of path in a plane parallel to the front face of the motor vehicle still consumes a relatively large amount of time, but the actual positioning of the test assembly directly opposite the headlight requires only a short time.

A more elaborate version of the invention has accordingly been worked out in which a preliminary step of the method first locates approximately the position of the headlight array of the motor vehicle. This is accomplished by means of the storage register apparatus designated 25 in FIG. 1. For approximate determination of the place at which a headlight is located, operation proceeds along the following lines. First the motor vehicle is brought up before the rails 10, so that the front of the vehicle is disposed parallel to the rails. All the headlights of the vehicle are then turned on, and the rolling test stand 11 is propelled once across the full portion of its displacement path that corresponds to the width of the vehicle. In this operation, light falls on several light sensitive resistors 27, at the height at which a headlight is located, and this illumination results in the lighting of the lamp 28 corresponding to each of the illuminated light sensitive resistors 27.

Figure 8:
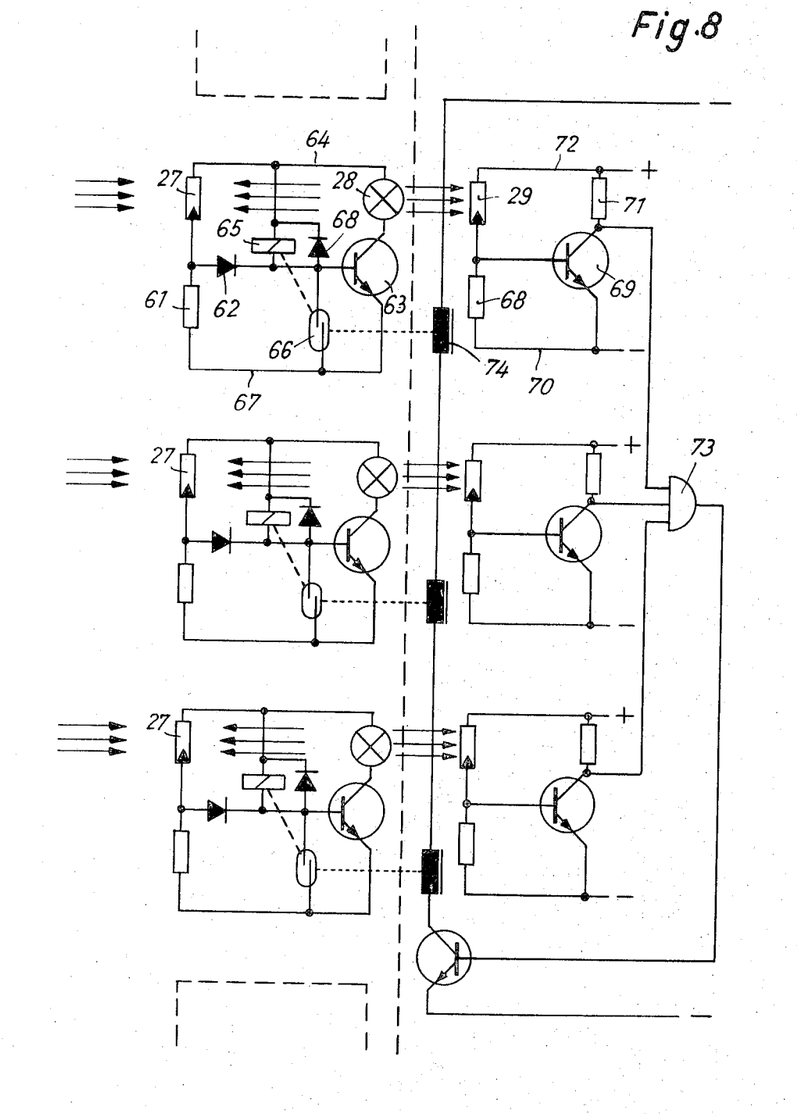
FIG. 8 is a circuit diagram of the storage register of the test assembly.

The circuit of the storage register unit is shown in FIG. 8. There the light sensitive resistors 27 are each associated with an individual circuit. Hence, only one of these circuits needs to be described here, since all of them are identical. The light sensitive resistor 27 forms a voltage divider with a resistor 61 to the junction or tap of which the base of a transistor 63 is connected through a diode 62. In the output load circuit of this transistor 63 is connected a lamp 28, connected between the collector of the transistor 63 and the common supply bus 64. Between the base of transistor 63 and the common supply bus 64, the operating winding of a relay 65 is connected. The contacts 66 of the relay 65 are interposed between the base of transistor 63 and the common supply bus 67 of the other polarity. A diode 68 is connected in parallel to the operating winding 65 of the relay in order to suppress voltage peaks produced in switching of the relay.

In the test assembly the three photosensitive resistors 29 are located opposite the storage register unit, so as to be illuminated by a facing lamp 28. Each light sensitive resistor 29 forms a voltage divider together with a resistor 68 and the tap of this voltage divider is connected to the base of a transistor 69, the emitter of which is connected to a common supply bus 70 and the collector of which is connected over a load resistor 71 to the other common supply bus 72. From the collector of the transistor 69 a connection is provided to an AND-gate 73, to the several inputs of which the output electrodes of other transistors are connected which belong to the other two circuits which are constituted in a form identical to that here described. The output of the AND-gate 73 is connected with a circuit for actuation of the displacement drive of the test assembly.

The manner of operation of the arrangement just described is as follows. The motor vehicle whose headlights are to be tested is driven up in front of the test apparatus, so that the front of the vehicle and the headlight array are parallel to the rails 10. The test stand is set in motion away from its initial position at the left and carries the storage register unit 25 once past the front of the motor vehicle, the headlights of which must of course be turned on for this operation. As the storage register unit passes by the headlights, a few of the light sensitive resistors 27 of the storage register unit 25 are illuminated, the particular ones illuminated depending upon the position of the headlights. The corresponding transistors 63 are thereby put into their conducting condition.

When a transistor 63 conducts, the corresponding lamp 28 is lighted and a portion of the light of the lamp 28 falls on thelight sensitive resistor 27 and keeps it illuminated. A self-holding effect is thus produced which persists after the storage register unit 25 moved beyond the motor vehicle headlights and ceases to be illuminated by them.

After the movable test stand 11, with its storage register unit 25, has passed by the headlights of the motor vehicle, the vertical movement of the test assembly is turned on until the test assembly reaches the position at which the lamps 28 are lit, at which point the test assembly is then stopped. In this operation the light sensitive resistors 29, located on the side of the test assembly, eventually receive light as the test assembly moves down from its top position, and the corresponding transistors 69 are put into their conducting condition. The reset magnets 74 are then, moreover, excited. Each of these closes a sealed tube contact in the storage register unit 25. Then, upon illumination of the three light sensitive resistors 29, the vertical movement of the test assembly 15 is brought to a stop. The test assembly then travels horizontally at this vertical level past the front of the vehicle towards its original position and searches for all of the headlights at this height. Finally, when it reaches its initial position a test is made to determine whether any more lamps of the storage register unit are lit. If that should be the case, the test assembly is then shifted to the new vertical level and at that level again passes in front of the vehicle and searches for headlights at this level, while the operations already described are repeated. The coarse positioning is carried out in each case in the end positions of the rolling test stand. When all of the lamps of the storage register unit are extinguished, the test stand and the test assembly return to their original positions. The closing of the sealed contacts 66 energizes the operating winding 65 of the relay, which then holds the corresponding contact 66 closed and keeps the corresponding lamp 28 extinguished. The lamps 28 can no longer be lit by further passes in front of the motor vehicle headlights, so long as their corresponding contacts 66 are held closed. This assures that headlights laready tested will not be picked up a second time for testing, and the test equipment will proceed to the next headlight instead. After the termination of the test procedure, the test assembly 15 and the test stand 11 automatically return to their original positions. At this time an interruption of the current supply, by means not shown, resets the circuits of the storage register unit.

The individual measurement of the motor vehicle headlights is carried out in connection with the procedure just described exactly in the same way as in the case of the previously described procedure in which there was no mention of the storage register unit 25.

It has been found particularly useful to provide circuit means to prevent the positioning of the test assembly between two headlights. If for example two headlights are located close to each other, it could happen that the light sensitive resistors 23 and 24 of the crosspiece 19 of the test assembly 15 are equally illuminated although the light sensitive resistors 23 are illuminated by one headlight and the light sensitive resistors 24 by the other. A logic circuit is therefore provided to correlate the direction of movement of the test assembly with the illumination response. A balance can then be found only if the light sensitive resistors 24 are first illuminated and the light sensitive resistors 23 thereafter. In that manner it is assured that when the test stand is moving to the right, when a balancedis reached a headlight is standing directly in front of the opening 18 of the test assembly 15.

It may further be useful in many cases to provide a hinge mounting for the cross-pieces 19 and 20 or their respective halves which are located in the neighborhood of the opening 18, so that they can be folded out of the way, either manually or automatically, when a headlight is actually being tested in order to assure the exclusion of any influence by these elements on the measurement.

In the foregoing description the light sensors associated with the cross-pieces 19 and 20 and with the storage register unit 25 have been described as light sensitive resistors, whereas the light sensors disposed on the measuring screen 37 have been described as light sensitive diodes. It is of course possible to provide light sensors for all of these various portions of the apparatus either in the form of light sensitive resistors or in the form of light sensitive diodes, and this explains why, for example in FIG. 8, the same symbols are used for the sensors 42 and 43 on the one hand and the sensors 21, 22, 23 and 24 on the other. Both of these types of light sensitive elements may be referred to as light sensors, light sensing means and the like.

We claim:
1. A method of testing motor vehicle headlights comprising the steps of:
   bringing the front of a vehicle with lighted headlights opposite and near a region of a vertical plane essentially parallel to the front of said vehicle, in which plane a movable test apparatus is both horizontally and vertically displaceable;
   detecting light intensities resulting from said lighted headlights at a plurality of places on said test apparatus in response to the distribution of said de- tected light intensities, by energizing a drive (54, 55) for displacing said apparatus in said plane and a control therefor, to bring said test apparatus directly opposite a headlight;

de-energizing said drive (54, 55) when a position directly opposite said headlight is reached; and thereafter performing a beam edge test on said headlight to produce an electrical indication of deviation from a predetermined standard.

2. A method as defined in claim 1, in which said test apparatus is displaced in accordance with a predetermined program of successive horizontal and vertical displacements to pick up and center on headlight location.

3. A method as defined n claim 1, in which the movements of said test apparatus in response to the distribution of detected light intensities comprises a first step in which one pass of said test apparatus across the front of said vehicle activates light sensitive storage register means to register approximately the heights at which headlights are located, a second step in which the measuring portion of said test apparatus is displaced vertically to a height determined by the first pass as a headlight height, a third step during which a second pass is made in front of the vehicle by the test apparatus during which the measuring portion of said test apparatus picks up and centers on the location of each headlight encountered and makes a beam boundary measurement test before moving on and also, in the event that there are headlights at more than one distinct height, a fourth step of an additional pass or passes for similarly finding and measuring other headlights, and finally a last step of re-setting the test apparatus to its initial position, the picking up and centering on headlight location being in each case accomplished by automatic means responsive to photoelectric sensing of light from the headlight.

4. Apparatus for testing headlights of a motor vehicle comprising:

a test stand (11, 14, 26, 30) movable in a first direction across the front of a motor vehicle presenting at least one lighted headlight (46) for testing;

a test assembly (15) movable in a second direction on said test stand across the front of said mooor vehicle, said first and second directions being at least approximately orthogonal to each other and both lying in a plane essentially parallel to said vehicle front;

driving means (54, 55) for moving said test stand and said test assembly in said directions;

distributed light sensitive means for sensing the distribution of light from headlights of said motor vehicle on said test assembly;

a control system for causing said driving means to locate said test assembly directly opposite a headlight to be tested and then to shut off said drive means and to cause performance of a test on said headlight, and optical test means (36, 37) with photoelectric sensors (42, 43) associated therewith for testing the light-to-dark boundary of the beam of said headlight when said headlight is directly opposite said test assembly.

5. Apparatus as defined in claim 4, in which distributed light sensitive sensors are disposed in a first sensor array aligned in said second direction on said test stand, and in second and third sensor arrays aligned respectively in said first and second directions on said test assembly, and in which, further, said control system comprises a front control means responsive to said first sensor array for approximately locating said test assembly opposite said headlight, and a second control means responsive to said second and third sensor arrays for accurately positioning said test assembly opposite said headlight.

6. Apparatus for testing headlights as defined in claim 5, in which said first control means is adapted to store indications of activation of sensors of said first sensor array by light until a subsequent displacement of said test assembly to a position corresponding to said indication has been effected.

7. Apparatus for testing headlights as defined in claim 5, in which said second and third sensor arrays each comprise at least two sensors arranged to produce interruption of the current supply of at least a part of said driving means (54, 55) upon reaching under illumination a predetermined illumination ratio.

8. Apparatus for testing headlights as defined in claim 5, in which said test stand is displaceable by rolling in a horizontal direction and has at least one column (14) on which said test assembly (15) is vertically movable and, further, in which said driving means comprises electric motors (54, 55) for respectively producing horizontal displacement of said test stand and vertical displacement of said test assembly.

9. Apparatus for testing headlights as defined in claim 5, in which said second and third sensor arrays are respectively aligned on two intersecting lines respectively drawn on two planes intersecting at least approximately orthogonally on a line substantially coinciding with the axis of said optical test r ' axis being substantially perpendicular to the p..ne in which said test apparatus is movable, and in which, further, said sensors of said arrays are carried on linear members supported on said test assembly.

10. Apparatus for testing headlights as defined in claim 9, in which said lines and linear members are curved concavely towards the headlight to be tested and said linear members are provided with borings (45) the extended axes of which intersect at the common center of curvature of said lines and said linear members and in which, further, said sensors of said second and third arrays are aligned in said borings (45).

11. Apparatus for testing headlights as defined in claim 9, in which said sensors of said second and third arrays aligned on each of said intersecting lines are arranged in two groups respectively on each side of the intersection of said lines.

12. Apparatus for testing headlights as defined in claim 11, in which said groups of sensors on each line are respectively connected to the inputs of a differential amplifier (51), the output signal of which operates a drive motor (54, 55) of said driving means.

13. Apparatus for testing headlights as defined in claim 12, in which upon equality of signals at the two inputs of said differential amplifier (51) the current supply circuit of the motor (54 or 55) of said drive which is arranged to be driven in response to an inequality of signals applied to said differential amplifier is interrupted.

14. Apparatus for testing headlights as defined in claim 13, in which the control exerted by the differential amplifier (51) on the current supply circuit of each motor of the drive of said test assembly depends both upon the output signal of said differential amplifier and the direction of displacement of said test assembly (15).

15. Apparatus for testing headlights as defined in claim 6, in which said test stand is movable in a horizontal direction and has at least one column (14) on which said test assembly is vertically movable and in which, further, said first array of sensors is mounted on a vertical strut (26) fixed on said test stand in the neighborhood of said test assembly (15).

16. Apparatus for testing headlights as defined in claim 15, in which said first control means comprises an indicator lamp (28) for each sensor (27) of said first sensor array so arranged that when a sensor (27) of said first array is illuminated, the corresponding indicator lamp (28) is lighted and a part of the light thereof falls on said sensor (27) and thereby maintains said indicator lamp (28) lit after removal of the original source of illumination of said sensor (27).

17. Apparatus for testing headlights as defined in claim 16, in which at least one light sensitive sensor (29) is provided on said test assembly (15) for illumination by an indicator lamp (28) of said first control means and is arranged in circuit, so that upon such illumination a switch is actuated in the current supply circuit of the drive (54, 55) of said test assembly (15) to stop the movement thereof in said second direction.

18. Apparatus for testing headlights as defined in claim 17, in which each light sensitive sensor (27) of said first sensor array is in the control current circuit of a transistor (63) individual to such sensor in the output of which transistor the said indicator lamp (28) is connected, and, further, said transistor (63) is arranged to be switched by a switch (66) adapted to be actuated by the proximity of an actuating member (74) mounted on said test assembly (15) and arranged, when actuated, to cause the corresponding indicator light to be held extinguished for the remainder of the test.

19. Apparatus for testing headlights as defined in claim 18, in which said switch (16) for switching said transistor (63) is in each case provided in the form of sealed contacts mounted on the side of said first control means that are adapted to be actuated by at least one magnet (74) fixed on said test assembly (15) and movable therewith.

20. Apparatus for testing headlights as defined in claim 15, in which said optical test means of said test assembly (15) includes a focussing means (36) and a measuring screen (37) with a standard light-to-dark boundary fixed thereon and that on said measuring screen, two tolerance ranges are defined respectively on each side of said boundary (38) by respective rows of light sensitive sensors (42, 43).

21. Apparatus for testing headlights as defined in claim 20, in which said light sensitive sensors (42, 43) defining said tolerance ranges are connected with an evaluation means for providing good and bad indications (58, 59) with reference to said headlight.

22. Apparatus for testing headlights as defined in claim 20, in which said measuring screen (37) is vertically displaceable to measure the extent of deviation of the light-to-dark boundary of the headlight beam from a predetermined standard.

23. Apparatus for testing headlights as defined in claim 22, in which said measuring screen (37) is arranged for vertical displacement by an electric motor (39).

24. Apparatus for testing headlights as defined in claim 23, in which a displacement sensor means (40) is provided for supplying an electric signal upon displacement of said measuring screen (37) out of its zero position.

25. Apparatus for testing headlights as defined in claim 24, in which said electrical signals produced by said displacement sensor means (40) is supplied to a deviation indicator (31) to provide a visible measurement of said deviation and thereby also a visible measurement for the adjustment of the headlight (46) under test.

26. A method of testing motor vehicle headlights as defined in claim 1, in which said electrical indication of deviation from a predetermined standard is in the form of an electrical indication of whether the beam is correct within a predetermined tolerance.

* * * * *